(12) United States Patent
Lida et al.

(10) Patent No.: US 10,116,471 B2
(45) Date of Patent: Oct. 30, 2018

(54) FAST ADAPTIVE MODE-CONVERSION DIGITAL CANCELLER

(71) Applicant: Valens Semiconductor Ltd., Hod Hasharon (IL)

(72) Inventors: Eyran Lida, Kfar Ha-Oranim (IL); Gaby Gur Cohen, Tel-Mond (IL); Aviv Salamon, Raanana (IL); Israel Greiss, Raanana (IL)

(73) Assignee: Valens Semiconductor Ltd., Hod Hasharon (IL)

( * ) Notice: Subject to any disclaimer, the term of this patent is extended or adjusted under 35 U.S.C. 154(b) by 0 days.

(21) Appl. No.: 15/371,239

(22) Filed: Dec. 7, 2016

(65) Prior Publication Data

US 2017/0099166 A1 Apr. 6, 2017

Related U.S. Application Data

(62) Division of application No. 15/006,049, filed on Jan. 25, 2016.
(Continued)

(51) Int. Cl.
*H04L 25/03* (2006.01)
*H04L 1/20* (2006.01)
(Continued)

(52) U.S. Cl.
CPC ......... *H04L 25/03885* (2013.01); *H04B 3/30* (2013.01); *H04L 1/0002* (2013.01);
(Continued)

(58) Field of Classification Search
CPC .................................................. H04L 25/03885
(Continued)

(56) References Cited

U.S. PATENT DOCUMENTS 5,283,811 A 2/1994 Chennakeshu et al.
5,473,321 A * 12/1995 Goodman ............... E21B 47/12
175/40
(Continued)

OTHER PUBLICATIONS

International search report, PCT/IB2016/050365, dated May 11, 2016.
(Continued)

*Primary Examiner* — Lihong Yu
(74) *Attorney, Agent, or Firm* — Active Knowledge Ltd.

(57) ABSTRACT

A transceiver and a corresponding method configured to recover within less than 1 ms from quality degradation in its operating point. The transceiver includes: a receiver analog front end (Rx AFE), an adaptive module comprising at least one of an adaptive digital equalizer and an adaptive digital canceller (ADEC), a common mode sensor AFE (CMS-AFE), a fast-adaptive mode-conversion canceller (FA-MCC), and a slicer. The Rx AFE receives signals from a second transceiver. Shortly after identifying quality degradation in the transceiver's operating point, the transceiver indicates the second transceiver to reduce the rate of the transmitted data. And within less than 1 ms, the transceiver utilizes the improved detection rate to improve the accuracy of the slicing errors, which enables fast adaptation of the ADEC, that improves the quality in the transceiver's operating point to a level that enables the transceiver to indicate the second transceiver to increase the rate.

15 Claims, 5 Drawing Sheets

Related U.S. Application Data

(60) Provisional application No. 62/107,483, filed on Jan. 25, 2015.

(51) Int. Cl.
  *H04L 1/00* (2006.01)
  *H04B 3/30* (2006.01)

(52) U.S. Cl.
  CPC .......... *H04L 1/20* (2013.01); *H04L 25/03305* (2013.01); *H04L 2025/03445* (2013.01)

(58) Field of Classification Search
  USPC ........................................................ 375/232
  See application file for complete search history.

(56) References Cited

U.S. PATENT DOCUMENTS

| | | | |
|---|---|---|---|
| 5,559,967 A | | 9/1996 | Oprescu et al. |
| 5,675,612 A | | 10/1997 | Solve et al. |
| 5,742,642 A | | 4/1998 | Fertner |
| 5,784,387 A | | 7/1998 | Widmer |
| 6,097,767 A | * | 8/2000 | Lo .......................... H04B 3/145 375/232 |
| 6,154,489 A | | 11/2000 | Kleider et al. |
| 6,734,920 B2 | | 5/2004 | Ghosh et al. |
| 6,735,260 B1 | | 5/2004 | Eliezer et al. |
| 6,757,367 B1 | | 6/2004 | Nicol |
| 6,897,712 B2 | | 5/2005 | Ficken et al. |
| 6,897,793 B1 | | 5/2005 | Kim et al. |
| 6,940,973 B1 | | 9/2005 | Yeap et al. |
| 6,985,492 B1 | | 1/2006 | Thi et al. |
| 7,003,094 B2 | | 2/2006 | Fischer et al. |
| 7,136,422 B2 | | 11/2006 | Segal et al. |
| 7,180,963 B2 | | 2/2007 | Wang et al. |
| 7,342,952 B2 | | 3/2008 | Smee et al. |
| 7,999,622 B2 | | 8/2011 | Galton et al. |
| 8,203,975 B1 | | 6/2012 | Chen et al. |
| 8,279,976 B2 | | 10/2012 | Lin et al. |
| 8,284,007 B1 | | 10/2012 | Langner et al. |
| 8,381,055 B2 | | 2/2013 | Christiaens et al. |
| 8,442,099 B1 | | 5/2013 | Sederat |
| 8,472,532 B2 | | 6/2013 | Schley-May et al. |
| 8,514,951 B2 | | 8/2013 | Tavassoli Kilani et al. |
| 8,861,663 B1 | | 10/2014 | Sedarat et al. |
| 8,983,000 B2 | | 3/2015 | Senst et al. |
| 2005/0053229 A1 | | 3/2005 | Tsatsanis et al. |
| 2005/0201757 A1 | * | 9/2005 | Bohn .................. H04B 10/2507 398/149 |
| 2006/0044030 A1 | | 3/2006 | Baez et al. |
| 2007/0237270 A1 | | 10/2007 | Mezer et al. |
| 2009/0240945 A1 | * | 9/2009 | Aronson ............. H04L 63/0428 713/176 |
| 2011/0268258 A1 | | 11/2011 | Alloin et al. |
| 2012/0163443 A1 | | 6/2012 | Cookman et al. |
| 2013/0155953 A1 | * | 6/2013 | Chu ..................... H04W 28/20 370/328 |
| 2013/0243049 A1 | | 9/2013 | Krinsky et al. |
| 2014/0112379 A1 | | 4/2014 | Biyani et al. |
| 2014/0301498 A1 | | 10/2014 | Rimini et al. |
| 2015/0085914 A1 | | 3/2015 | Kizer et al. |

OTHER PUBLICATIONS

Written opinion of the international searching authority, PCT/IB2016/050365, dated May 11, 2016.

* cited by examiner

FAST ADAPTIVE MODE-CONVERSION DIGITAL CANCELLER

CROSS-REFERENCE TO RELATED APPLICATIONS

This application is a Divisional of U.S. application Ser. No. 15/006,049, filed Jan. 25, 2016, which claims priority of U.S. Provisional Application No. 62/107,483, filed on 25 Jan. 2015.

BACKGROUND

Differential signaling is a method of transmitting information with two complementary signals on two conductors, such as paired wires. Differential signaling usually improves resistance to electromagnetic interference (EMI) since the information is conveyed through the difference between the voltages on the wires. However, if there are imbalances or asymmetries between the two conductors, common mode components may arise even when the two conductors are differentially driven. The presence of common mode currents on a cable does not inherently degrade the integrity of differential signaling, but if energy can be transferred from a common mode to a differential mode, then the common mode current can become a dominant interference signal, in a phenomenon known as mode-conversion or mode coupling.

Mode conversion can cause significant performance degradation. While internal interference sources (such as ISI, echo, FEXT, and NEXT) are known to the link partners and can be cancelled effectively with cancellers and equalizers, the mode conversion interference is unknown until it occurs, and thus presents difficulties for the desired performance of high bandwidth communication systems.

SUMMARY

In one embodiment, a transceiver is configured to recover within less than 1 millisecond from quality degradation in its operating point. The transceiver includes the following elements: a receiver analog front end (Rx AFE), an adaptive module comprising at least one of an adaptive digital equalizer and an adaptive digital canceller (ADEC), a common mode sensor AFE (CMS-AFE), a fast-adaptive mode-conversion canceller (FA-MCC), and a slicer. The Rx AFE receives a signal of more than 500 Mbps from a second transceiver over a differential wired communication link, and feeds the ADEC that generates an equalized signal. The CMS-AFE senses the common mode signal of the differential wired communication link and feeds the FA-MCC that generates a compensation signal; wherein the compensation signal is indicative of differential interference caused by mode-conversion of a common mode signal. The slicer utilizes the equalized signal and the compensation signal to generate slicing decisions and slicing errors; wherein the slicing errors are used to adapt the ADEC and the FA-MCC. Shortly after identifying quality degradation in the transceiver's operating point, the transceiver indicates the second transceiver to reduce the rate of the transmitted data in order to improve detection rate at the transceiver. And within less than 1 millisecond from identifying the quality degradation, the transceiver utilizes the improved detection rate to improve the accuracy of the slicing errors, which enables fast adaptation of the ADEC, that improves the quality in the transceiver's operating point to a level that enables the transceiver to indicate the second transceiver to increase the rate.

In another embodiment, a method for recovering within less than 1 millisecond from quality degradation in a transceiver's operating point includes the following steps: receiving, by the transceiver, a signal of more than 500 Mbps from a second transceiver over a differential wired communication link; feeding the signal to an adaptive module comprising at least one of an adaptive digital equalizer and an adaptive digital canceller (ADEC), for generating an equalized signal; sensing the common mode signal of the differential wired communication link; feeding the sensed signal to a fast-adaptive mode-conversion canceller (FA-MCC) that generates a compensation signal; wherein the compensation signal is indicative of differential interference caused by mode-conversion of a common mode signal; utilizing the equalized signal and the compensation signal for generating slicing decisions and slicing errors; utilizing the slicing errors for adapting the ADEC and the FA-MCC; shortly after identifying quality degradation in the transceiver's operating point, indicating the second transceiver to reduce the rate of the transmitted data in order to improve detection rate at the transceiver; and within less than 1 millisecond from identifying the quality degradation, utilizing the improved detection rate to improve the accuracy of the slicing errors, which enables fast adaptation of the ADEC, that improves the quality in the transceiver's operating point to a level that enables the transceiver to indicate the second transceiver to increase the rate.

BRIEF DESCRIPTION OF THE DRAWINGS

The embodiments are herein described, by way of example only, with reference to the accompanying drawings. In the drawings.

DETAILED DESCRIPTION

Figure 1A:
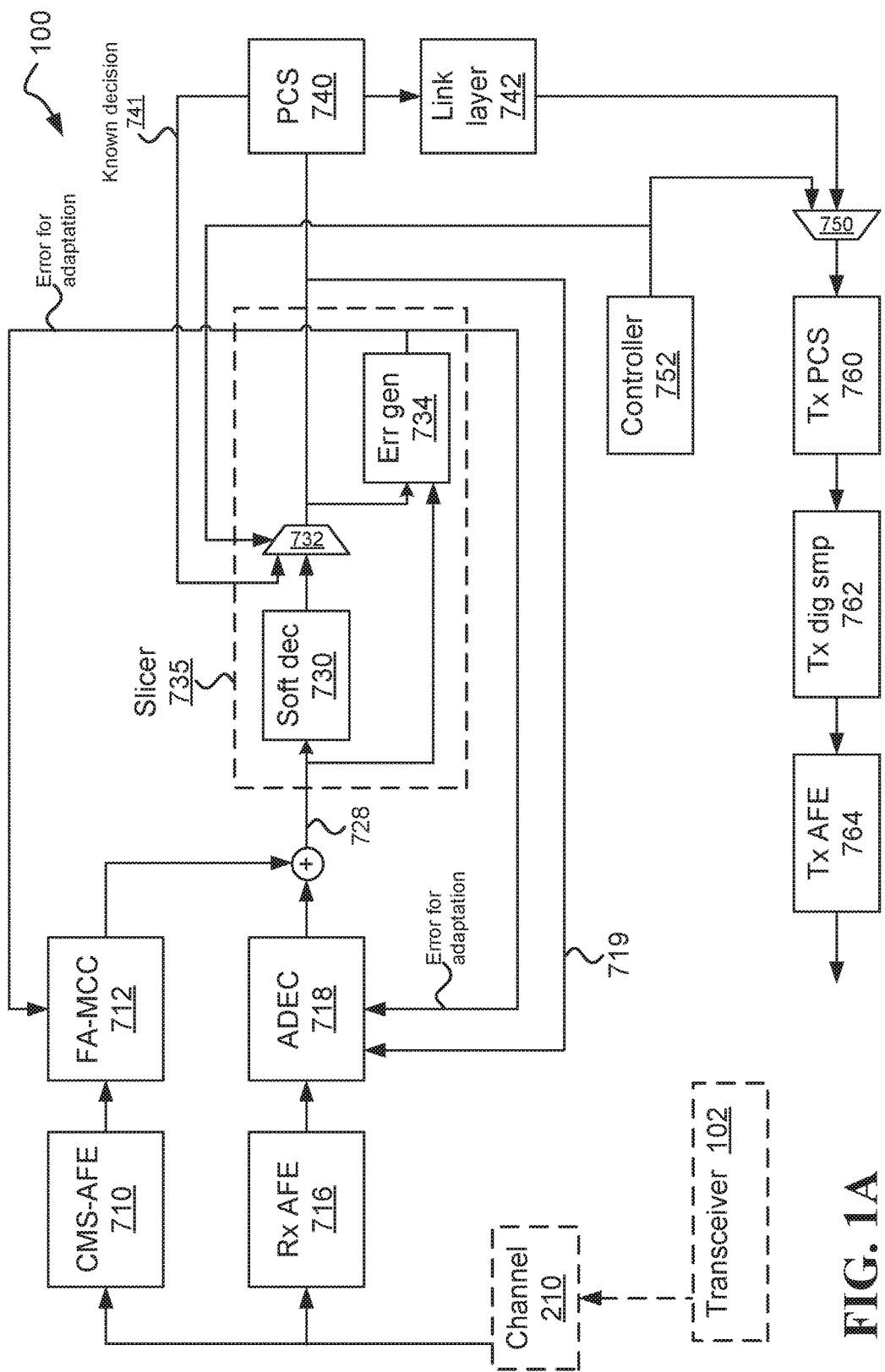
FIG. 1A illustrates one embodiment of a transceiver that converges fast.

FIG. 1A illustrates one embodiment of a transceiver that converges fast. Transceiver 100 (which does not includes the channel 201 and the transceiver 102) includes the following elements: a common mode sensor analog front end (CMS-AFE 710), a fast-adaptive mode-conversion canceller (FA-MCC 712), a receiver analog front end (Rx AFE 716), an adaptive digital equalizer and canceller (ADEC 718), a slicer 735 (that includes a soft decision 730, a selector 732, and an error generator 734), a Physical Coding Sublayer (PCS 740), a link layer 742, a controller 752, a selector 750, a transmitter PCS (Tx PCS 760), a transmitter digital sampler (Tx dig samp 762), and a transmitter AFE (Tx AFE 764).

The soft decision 730 decides on the reconstructed representation of the original transmitted signal 728 by slicing the reconstructed representation of the original transmitted signal 728. In one embodiment, when a serious interference is too high, the ability of the soft decision 730 to make an accurate decision may not be good enough, and/or the convergence time of the transceiver 100 may be too long. Thus, the controller 752 requests the transceiver 102 to transmit known data (such as to transmit the idle sequence, or a sequence based on the idle sequence), and configures the selector 732 to output the known decision received from the PCS 740 instead of the probably wrong decision received from the soft decision 730. As a result of configuring the selector 732 to output the known decision, the error generator 734 is now able to generate the correct error based on the reconstructed representation of the original transmitted signal 728 and the known decision 741 received from the PCS 740. The correct error enables the ADEC 718 and FA-MCC 712 to converge fast because their convergence speed is function of the noisiness of the error, and thus receiving the correct error accelerates their convergence. Using the known decision 741 also reduces the error propagation of the ADEC 718 because the correct decision is fed from selector 732 over line 719 to the ADEC 718. Therefore, having the correct error by injecting the known decision 741 supports fast adaptation, reduces error propagation, and moves the transceiver 100 into a stable state—also when the differential communication channel suffers from a serious interference.

Figure 1B:
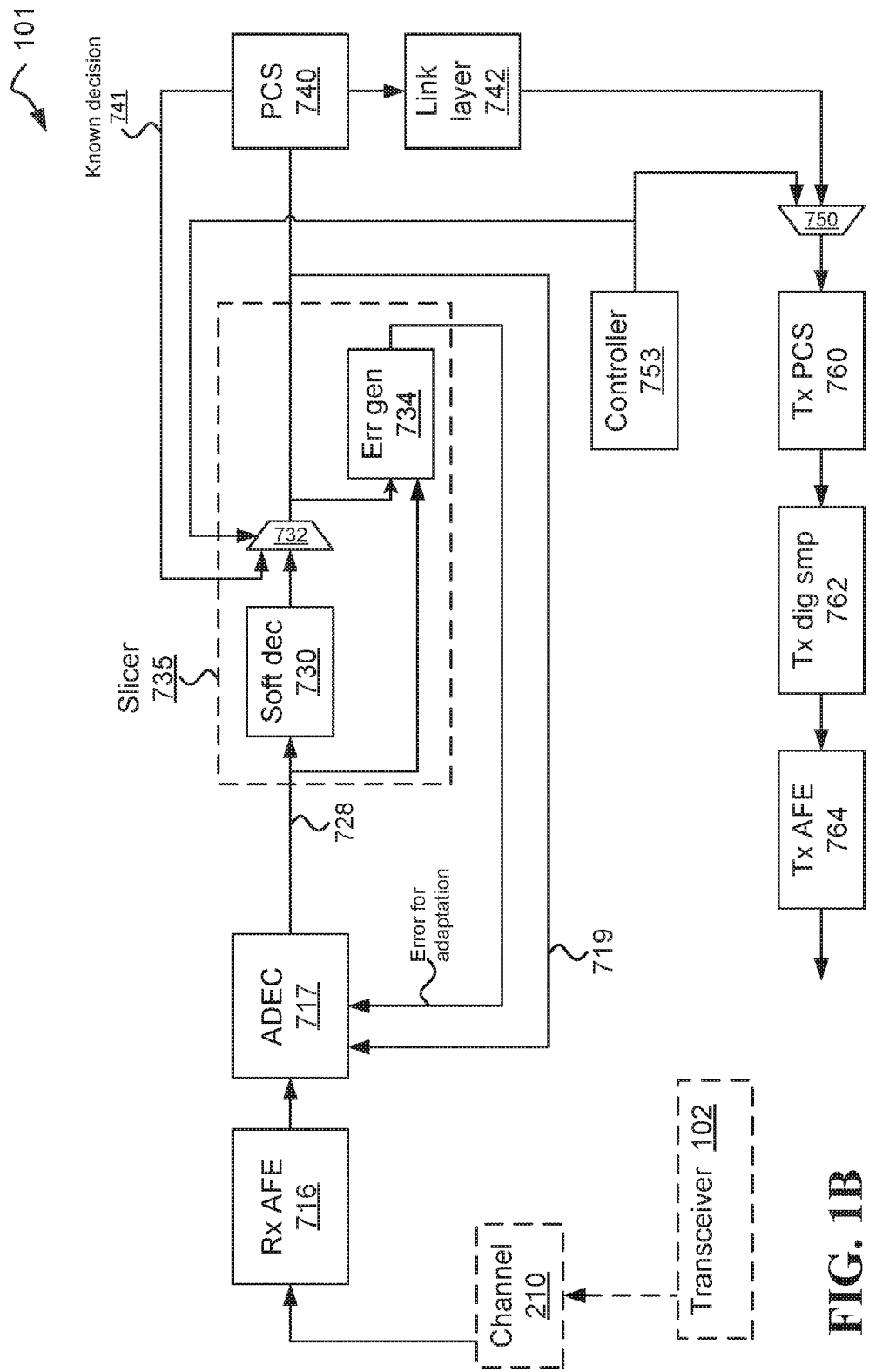
FIG. 1B illustrates an alternative embodiment of a transceiver that converges fast.

FIG. 1B illustrates an alternative embodiment of a transceiver that converges fast. Transceiver 101 does not include an FA-MCC component, although the ADEC 717 may include the functionality of the FA-MCC 712. Controller 753 may be similar to controller 752, which the difference that controller 753 may be designed to operate without an FA-MCC component.

In one embodiment, first and second transceivers forward time sensitive data at a predetermined average rate and up to a predetermined packet delay variation, includes:

An Rx analog front end (AFE) and a common mode sensor AFE (CMS-AFE) that couple the second transceiver to a differential communication channel coupled to the first transceiver. The differential communication channel is not completely known, and the first and second transceivers are expected to work at a first packet loss rate when there is no serious interference. From time to time the differential communication channel may suffer from serious interferences that increase significantly the packet loss rate to a second packet loss rate that is at least ten times the first packet loss rate.

The CMS-AFE extracts a digital representation of a common mode signal of the received differential signal, and forward it to a fast-adaptive mode-conversion canceller (FA-MCC) that generates a compensation signal to cancel the differential interference caused by mode-conversion of the common mode signal.

The FA-MCC utilizes large adaptation step size to cancel the effect of the serious interference fast.

The Rx AFE extracts the received differential signal and feeds it to an adaptive digital equalizer and canceller (ADEC). The ADEC includes one or more equalizers, such as Decision Feedback Equalizer (DFE) and/or Feed-Forward Equalizer (FFE), and one or more cancellers, such as FEXT canceller.

The FA-MCC and the ADEC reconstruct a representation of the original transmitted signal, and feed the representation of the original transmitted signal to a slicer that feeds a Physical Coding Sublayer (PCS) with sliced symbols. In one example, the original transmitted signal is the signal sent from the first transceiver before shaping.

The PCS extracts a bitstream from the sliced symbols, and feeds a link layer component that parses the sliced symbols into packets. It is noted that bitstream includes bytestream and all other similar equivalents.

The link layer component comprises a retransmission module that: requests retransmission of packets with errors, and forwards the packets in the correct order after receiving the retransmitted packets. It is noted that packets with errors includes missing packets and any other packet that may require retransmission.

And the FA-MCC converges at a short time, such that the retransmissions caused by the serious interference still enable the transceiver to forward packets at the predetermined average rate and within the predetermined packet delay variation.

Figure 2A:
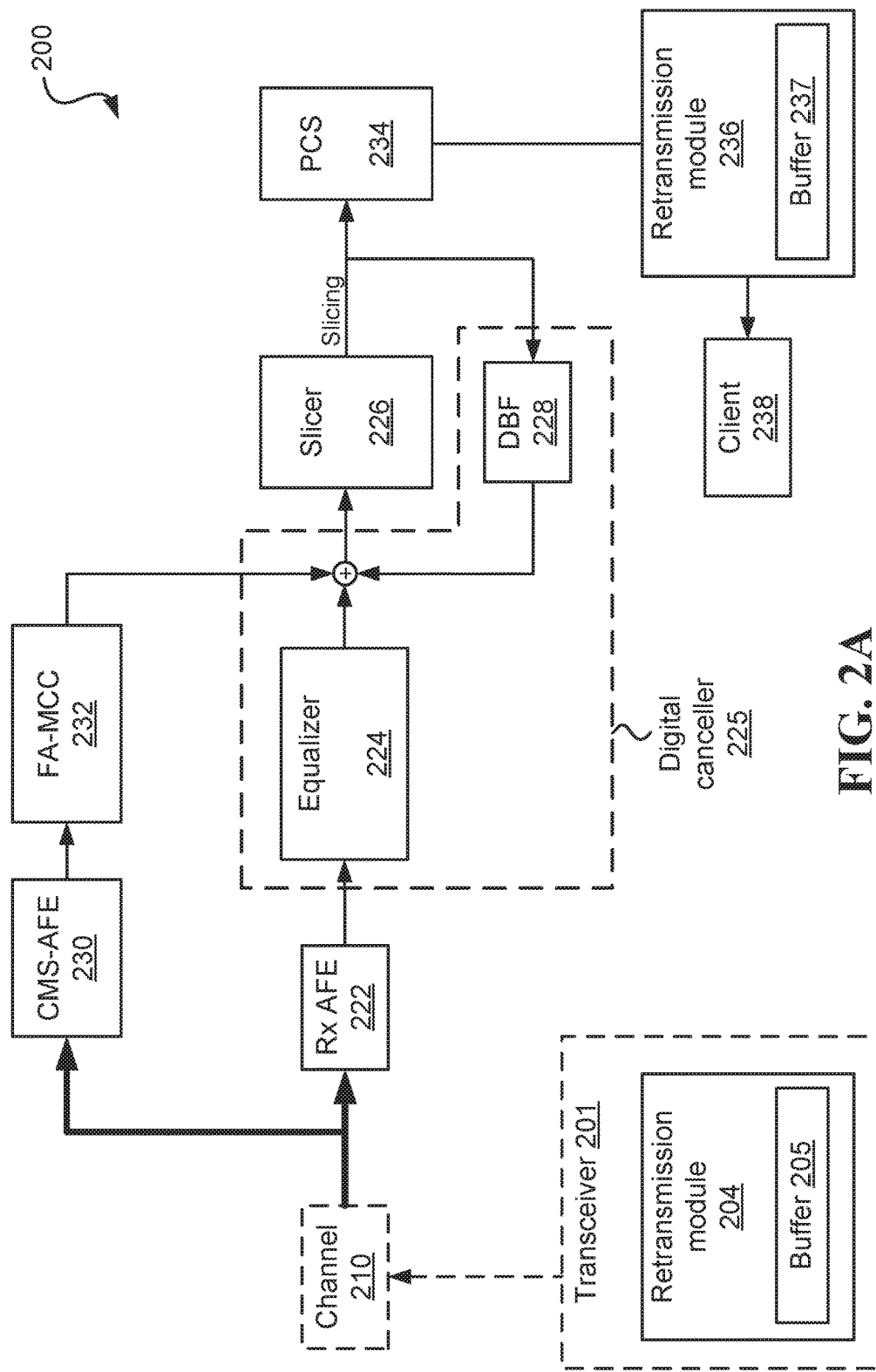
FIG. 2A illustrates one embodiment of a communication system operating over a differential communication channel that is not completely known.

FIG. 2A illustrates one embodiment of a communication system operating over a differential communication channel that is not completely known and may suffer from serious common-mode-to-differential-mode interference (in some cases may be shortly referred to as "serious interference"). The communication system includes a transceiver 201 and a transceiver 200 (which does not include the transceiver 201 and the channel 210), capable of communicating at a high throughput, with communication rates possibly exceeding 120 Mbps, 1.2 Gbps, or 10 Gbps.

The communication system is implemented, at least in part, on Integrated Circuits (ICs) having limited resources. The communication system further implements a retransmission module on the ICs. In one embodiment, the first transceiver utilizes a retransmission module 204 that uses a buffer 205 to store packets that may have to be retransmitted. In one embodiment, the second transceiver utilizes a retransmission module 236 that uses a buffer 237 to store the received packets until all the packets are received successfully, and then the buffer may forward the received packets in the correct order to a client. Additionally or alternatively, the retransmission module 236 may use the buffer 237 to store the received packets for a short period until it is possible to forward them to the client, optionally in the order of their arrival, which may not be the correct order.

The sizes of the buffers (205, 237) used by the retransmission module may be limited in order to save cost. In one example, the buffer 205 of the first transceiver can store up to 20 microseconds of traffic sent at the highest communication rate. In another example, the second transceiver forwards the packets in the correct order and the buffer 237 of the second transceiver can store up to 30 microseconds of traffic sent at the highest communication rate. In still another example, at least one of the buffers used by the first and second transceiver can store up to 100 microseconds of traffic sent at the highest communication rate.

Upon detecting a new serious interference, the second transceiver utilizes a fast-adaptive mode-conversion canceller (FA-MCC) to generate a compensation signal to cancel the differential interference caused by mode-conversion of the common mode signal. Optionally, until the interference is cancelled, the first transceiver retransmits the lost packets. The FA-MCC may not have in advanced information regarding the properties of the interference, and thus the FA-MCC uses large adaptation step size that enables fast convergence. Although the actual size of the large adaptation step size depends on the specific implementation, a person skilled in the art should be able to calculate the values of the large adaptation step sizes to support convergence time that is short enough for the communication system to meet its design goals and/or real-time requirements. One example of a design goal is not to exceed the limited capacity of one or more of the buffers 205 and 237 used by the retransmission module. One example of a real-time requirement is not to exceed the maximum permitted delay allocated to the communication channel.

As a result of the large adaptation step size, the convergence of the FA-MCC after a serious interference is usually not optimal.

In one example, the serious interference causes packet loss to exceed 50% at the second transceiver, and the FA-MCC is designed to converge within less than 20 microseconds to a level that reduces the packet loss at the second transceiver to less than 5%. Optionally, packet loss is calculated as the number of packet lost divided by the number of packets sent.

In another example, the serious interference causes packet loss to exceed 10% at the second transceiver, and the FA-MCC is designed to converge within less than 10 microseconds to a level that reduces the packet loss at the second transceiver to less than 1%.

In still another example, the serious interference causes packet loss to exceed 2% at the second transceiver, and the FA-MCC is designed to converge within less than 20 microseconds to a level that reduces the packet loss at the second transceiver to less than 0.1%.

In one embodiment, the communication channel is relatively short (for example, shorter than 10 meters, or shorter than 3 meters) and thus is not considered difficult. In such a channel, the communication system can operate well enough with the non-optimal convergence of the FA-MCC because the leftover interference that was not cancelled does not prevent successful communication over the channel.

The digital canceller 225 may be implemented in various ways. FIG. 2A illustrates one example in which the digital canceller 225 includes at least an equalizer 224 and a Decision Based Filter (DBF) 228. In one example, equalizer 224 may be a Feed Forward Equalizer (FFE).

The term "Decision Based Filter", such as DBF 228, refers to a filter fed at least by a slicer's output, such as slicing results and/or slicing errors. In one example, the DBF includes a non-adaptive Decision Feedback Equalizer (DFE), or a non-adaptive FEXT canceller, fed by the slicing results. In another example, the DBF includes an adaptive DFE, or an adaptive FEXT canceller, fed by the slicing results and/or the slicing errors. In still another example, the DBF includes an adaptive Feed-Forward Equalizer (FFE) fed by the slicing errors for adaptation purpose.

The term "slicer" or "slicer function", such as slicer 226, is defined as a one or more dimensional quantizer that outputs the quantization result. Optionally, the slicer may include different slicers for different modulations. Optionally, the slicer may output one or more of the following indications: the error between the received signal and the quantization result, the slicer function used for producing the slicing result, the direction of the slicing error, and/or other indications.

The slicing results are fed to a Physical Coding Sublayer (PCS), such as PCS 234, which parses the data packets and extracts information such as a packet header, a packet payload, a packet tail, and/or an error detection code. It is noted that herein an "error detection code" also covers an "error correction code".

In one embodiment, the retransmission module 236 receives the parsed packets from the PCS 234, and based on the received parsed packets it may request retransmission of the packets with errors. In one embodiment, one of the relationships between the FA-MCC and the retransmission module 236 is that the buffer 237 is large enough to buffer packets that are received until the FA-MCC cancels the effect of the serious interference. The combination of the FA-MCC and the retransmission module 236 enables the system to use small retransmission buffers also when operating over a communication channel that is not completely known and suffers from serious common-mode-to-differential-mode interference.

Figure 2B:
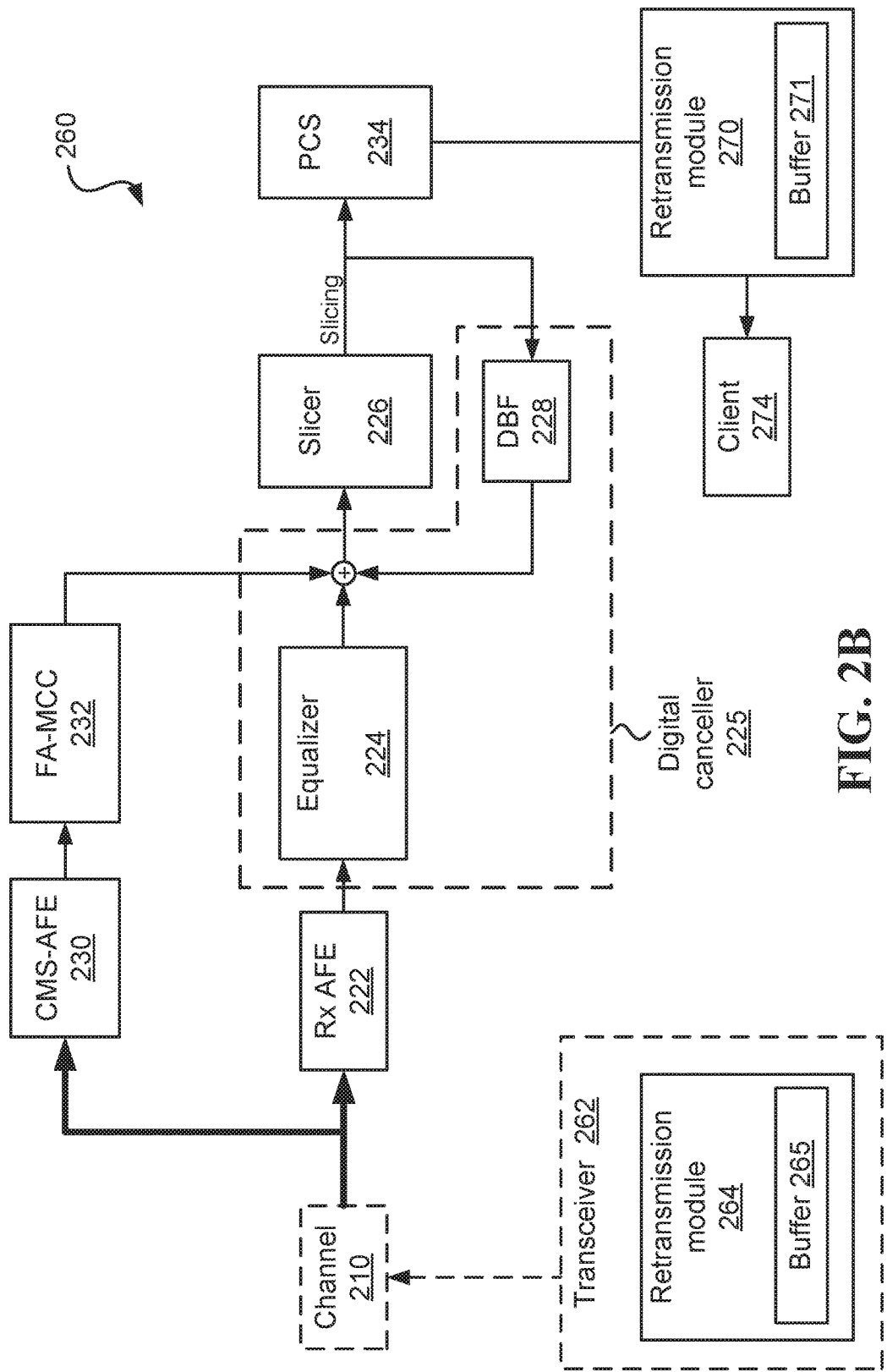
FIG. 2B illustrates another embodiment of a communication system operating over a differential communication channel that is not completely known.

FIG. 2B illustrates one embodiment of a communication system operating over a differential communication channel that is not completely known and may suffer from serious common-mode-to-differential-mode interference. The communication system includes a transceiver 262 and a transceiver 260 (which does not include the transceiver 262 and the channel 210), capable of communicating at a high throughput, with communication rates possibly exceeding 100 Mbps, 1 Gbps, or 10 Gbps.

The transceiver 260 is implemented on an integrated circuit (IC) having limited resources. The transceiver 260 includes at least first and second AFEs (222, 230) coupled to the transceiver 262 over a differential communication channel 210 that is not completely known; from time to time the differential communication channel may suffer from serious interferences that prevent normal operation.

The CMS-AFE extracts a digital representation of a common mode signal of the received differential signal, and forwards it to a fast-adaptive mode-conversion canceller (FA-MCC) that generates a compensation signal to cancel the differential interference caused by mode-conversion of the common mode signal. The FA-MCC utilizes large adaptation step size to cancel the effect of the serious interference fast. The large adaptation step size enables it to cancel, within less than 20 microseconds, the effect of the serious common-mode-to-differential-mode interference to a level that enables the normal operation. The digital canceller 225 feeds a slicer 226 that feeds a PCS 234 with quantization results. The PCS 234 extracts packet data from the quantization results and drives a retransmission module 270 that requests retransmission of the packets with errors based on the packet data. In one embodiment, the retransmission module is limited to support retransmission of up to 200% of the packets received during the time it takes the FA-MCC to cancel the effect of the serious interference.

In one embodiment, the retransmission module 270 is implemented on the IC with limited resources that cannot support retransmission of more than 200% of the packets received during the time it takes the FA-MCC to cancel the effect of the serious interference. In one embodiment, the retransmission module includes a retransmission buffer 271 able to store up to 200% of the packets received during the time it takes the FA-MCC to cancel the effect of the serious interference. In one embodiment, the retransmission module 270 is limited to support retransmission of up to 200% of the packets received during the time it takes the FA-MCC to cancel the effect of the serious interference in order to achieve one or more of the following requirements: a maximum allowed jitter, a maximum amount of dropped packets, and requirements related to time sensitive data transmitted over the communication channel.

In one example, the retransmission module further comprises a buffer that stores the received packets until all packets are received successfully. Additionally or alternatively, the size of the buffer is limited to store the amount of packets that are received during up to 20 microseconds of normal operation. Additionally or alternatively, the retransmission module further comprises a buffer that stores the received packets until they are requested by a client.

In one example, the packet data comprises information related to a packet header, a packet payload, a packet tail, and/or an error detection code. Additionally or alternatively, the FA-MCC may not be configured to converge optimally, and as such may not reach an optimal solution even after 1 second. Additionally or alternatively, the digital canceller may include an equalizer and a Decision Based Filter (DBF). Additionally or alternatively, the equalizer may be a Feed Forward Equalizer (FFE). Additionally or alternatively, the DBF may be a filter fed by an output of the slicer.

In some embodiments, upon detecting a serious interference, the communication system reduces the code rate until the FA-MCC cancels the effect of the serious interference. After the FA-MCC cancels the effect of the serious interference, the communication system increases the code rate, optionally until returning to the code rate used before the serious interference was detected.

Reducing the code rate improves the packets' robustness to noise, and thus enables the transceiver to receive at least some of the packets successfully. Reducing the code rate may be implemented in addition to the retransmission module described above.

The code rate may be reduced by various techniques such as Dynamic Modulation Coding (DMC), adding Error Correction Code (ECC), and/or transmitting a known sequence (that reduces the code rate to practically zero).

In one embodiment, the code rate is reduced by decreasing the modulation order using Dynamic Modulation Coding (DMC). DMC is described, for example, in U.S. Pat. No. 8,565,337, titled "Devices for transmitting digital video and data over the same wires", which is incorporated herein by reference in its entirety. For example, upon detecting a serious interference, a Pulse-Amplitude Modulation (PAM) transceiver may switch from using PAM16 to PAM4 until the FA-MCC cancels the effect of the serious interference, and then switch from PAM4 to PAM8, and from PAM8 back to PAM16 when the channel properties allow.

In another embodiment, the code rate is reduced by adding ECC, either by adding ECC when there was no ECC, or by increasing the amount of the ECC overhead in order to improve the Signal to Noise Ratio (SNR). For example, the ECC may be added by continually adding ECC overhead to the stream, optionally in a similar manner to convolutional codes. Additionally or alternatively, the ECC may be added/strengthened by adding the EC overhead to fixed length data segment, optionally in a similar manner to block codes.

In another embodiment, the code rate is reduced to practically zero by transmitting a known sequence. In one example, the known sequence is based on the scrambler sequence, such as transmitting the scrambler, or transmitting bitwise complement code words of the scrambler. In another example, the known sequence is based on the idle sequence, such as transmitting the idle sequence, or transmitting bitwise complement code words of the idle sequence. One embodiment of a transmitter that transmits bitwise complement code words of the idle sequence includes an encoder configured to encode a first frame, a basic idle sequence, and a second frame, wherein the first frame, the basic idle sequence, and the second frame include code words. The transmitter further includes an idle sequence modifier configured to produce an idle sequence by replacing certain M code words of the basic idle sequence with M bitwise complement code words (where, optionally, each bitwise complement code word appears in the basic idle sequence). Bitwise complement, also known as bitwise NOT, applies logical negation on each bit, forming the ones' complement of a given binary value. For unsigned integers, the bitwise complement of a number is the mirror reflection of the number across essentially the half-way point of the unsigned integer's range.

Figure 3:
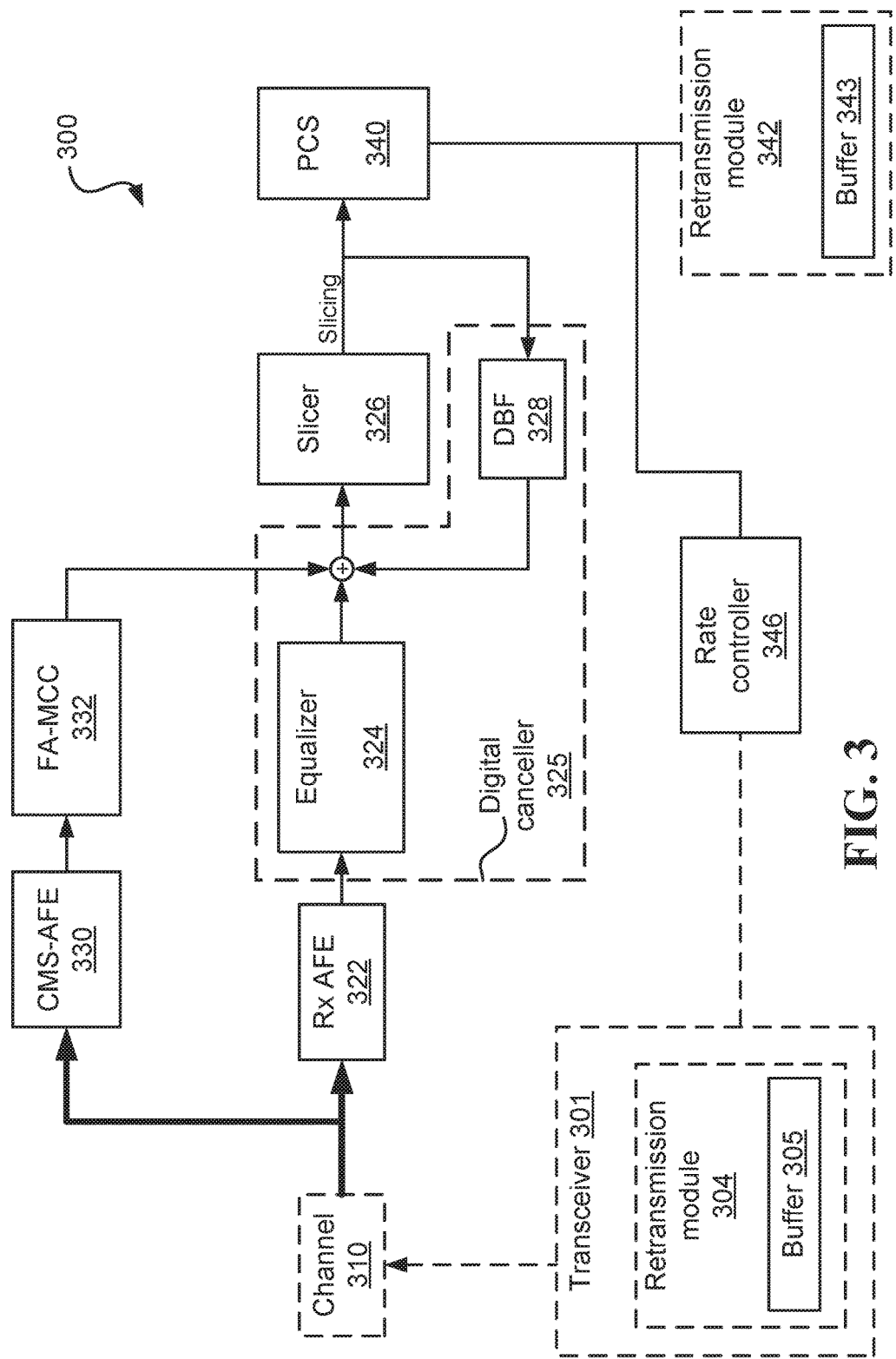
FIG. 3 illustrates one embodiment of a communication system operating over a differential communication channel.

FIG. 3 illustrates one embodiment of a communication system operating over a differential communication channel 310 that is not completely known and may suffer from serious common-mode-to-differential-mode interference. The communication system includes a transceiver 301 and a transceiver 300 (which does not include the transceiver 301 and the channel 310) capable of communicating at a high throughput, with communication rates possibly exceeding 100 Mbps, 1 Gbps, or 10 Gbps.

The communication system may be implemented, at least in part, on Integrated Circuits (ICs) having limited resources. In one embodiment, the transceiver 301 utilizes a retransmission module 304 that uses a buffer 305 to store the packets that may have to be retransmitted. In one embodiment, the transceiver 300 utilizes a retransmission module 342 that uses a buffer 343 to store the received packets until all the packets are received successfully.

In one embodiment, the sizes of the buffers (305, 343) used by the retransmission modules may be limited in order to save cost. In one example, the buffer 305 of the transceiver 301 can store up to 20 microseconds of traffic sent at the highest communication rate. In another example, the transceiver 300 forwards the packets in the correct order and the buffer 343 of the transceiver 300 can store up to 30 microseconds of traffic sent at the highest communication rate. In still another example, at least one of the buffers of the transceiver 301 and transceiver 300 can store up to 100 microseconds of traffic sent at the highest communication rate.

Upon detecting a new serious interference, the transceiver 300 utilizes the FA-MCC with large adaptation step size to cancel the effect of the serious interference fast. Until the interference is cancelled, the rate controller 346 reduces the rate of transmitting the packets in order to improve the packets' robustness to noise.

In response to receiving an indication from the PCS 340 about the serious interference, the rate controller 346 commands the transceiver 301 to reduce its code rate, and updates the transceiver 300 about the reduction in the code rate. In response to receiving a further indication from the PCS 340 that the FA-MCC successfully canceled the effect of the serious interference, the rate controller 346 commands the transceiver 301 to increase its code rate, and updates the transceiver 300 about the increment in the code rate.

The indication from the PCS 340 to the rate controller 346 may by function of one or more of the following values: the percent of the lost packets, the rate of the lost packets, a function of the lost and successfully received packets, a score proportional to the detected interference, a score proportional to a slicing error provided by the slicer 326, and/or a score proportional to the number of errors detected by the PCS 340.

In one example, the command from the rate controller 346 to the transceiver 300 about the reduction in the code rate causes the slicer 326 to change its slicer function to a slicing function suitable for the reduced code rate.

Upon detecting that the effect of the serious interference has been cancelled by the FA-MCC, the rate controller 346 increases the code rate of transmitting the packets.

In one embodiment, at least one of the packets that could not been sent due to insufficient bandwidth while the code rate was reduced, is discarded without attempting a delayed transmission or retransmission. In one example, the traffic transmitted over the communication channel 310 includes video pixel data that is discarded during the time the systems uses the lower code rate.

In another embodiment, at least some of the packets that could not be sent while the code rate was reduced, are stored, optionally in buffer 305 at the transceiver 301, and transmitted after the code rate is restored to a level that permits transmission of the extra data. In one example, the traffic transmitted over the communication channel 310 includes time sensitive data (e.g., video synchronization data) and time insensitive data (e.g., Ethernet data). While operating in the lower code rate, the system continues to transmit the time sensitive data, and stores the time insensitive data optionally in buffer 305. After cancelling the interference and restoring the code rate to a level having higher bandwidth, the system transmits the stored time insensitive data in parallel to transmission of ongoing data.

In one example, the command from the rate controller 346 to the transceiver 300 about increasing the code rate causes the slicer 326 to change its slicer function to one suitable for the higher code rate.

The convergence of the FA-MCC after serious interference is usually not optimal because an optimal convergence is usually not fast enough.

In one example, the serious interference causes packet loss to exceed 50% at the transceiver 300, and the FA-MCC is designed to converge within less than 20 microseconds to a level that reduces the packet loss at the transceiver 300 to less than 5%.

In another example, the serious interference causes packet loss to exceed 10% at the transceiver 300, and the FA-MCC is designed to converge within less than 10 microseconds to a level that reduces the packet loss at the transceiver 300 to less than 1%.

In still another example, the serious interference causes packet loss to exceed 2% at the transceiver 300, and the FA-MCC is designed to converge within less than 20 microseconds to a level that reduces the packet loss at the transceiver 300 to less than 0.1%.

The digital canceller 325 may be implemented in various ways. FIG. 3 illustrates one example in which the digital canceller 325 includes at least an equalizer 324 and a DBF 328. In one example, the equalizer 324 and/or the DBF 328 may have different functions for the different data rates.

Using different function for different data rates is described, for example, in U.S. Pat. No. 8,930,795, titled "Methods for slicing dynamically modulated symbols", which is incorporated herein by reference in its entirety. For example, the slicing results are fed to the PCS 340, which parses the data packets and extracts information such as a packet header, a packet payload, a packet tail, and packet modulation information. The PCS 340 determines the modulation used by the transceiver 301, and indicates the slicer 236 of which slicing function to use. The slicer 326 may then provide the slicing results from the indicated slicer to the DBF 328. Optionally, the slicer 326 may additionally provide slicing errors associated with the slicing results. Following that, the DBF 328 generates the appropriate output and adds it to the incoming signal from the equalizer 324.

In one embodiment, the transceiver 300 includes an optional retransmission module 342 that receives the parsed packets from the PCS 340, and based on the received parsed packets it may request retransmission of the packets with errors. In one embodiment, one of the relationships between the FA-MCC and the retransmission module 342 is that the buffer 343 used by the retransmission module 342 is large enough to store the arriving packets until the FA-MCC cancels the effect of the serious interference. The combination of the fast converging FA-MCC and the retransmission module 342 enables both transceivers 300 and 301 to use small retransmission buffers also when operating over a communication channel that is not completely known and suffers from serious common-mode-to-differential-mode interference.

As a result of reducing the code rate, some of the packets may not be transmitted even once because the effective communication bandwidth is reduced. These packets may be stored in the retransmission buffer 305 at the transceiver 301, which has to be large enough to store the packets that cannot be transmitted as long as the system operates at the lower code rate (typically until the effect of the serious common-mode-to-differential-mode interference is cancelled to a sufficient level).

The following four embodiments summarize certain non-limiting aspects of the inventions:

Embodiment #1

A transceiver configured to recover within less than 1 millisecond from quality degradation in its operating point, comprising: a receiver analog front end (Rx AFE), an adaptive module comprising at least one of an adaptive digital equalizer and an adaptive digital canceller (ADEC), and a slicer; the Rx AFE receives a signal of more than 500 Mbps from a second transceiver over a link, and feeds the signal to the ADEC that generates a slicer input signal; the slicer utilizes the slicer input signal to generate slicing decisions and slicing errors; wherein the slicing errors are used to adapt the ADEC; shortly after identifying quality degradation in the transceiver's operating point, the transceiver indicates the second transceiver to transmitting known data; and within less than 1 millisecond from identifying the quality degradation, the transceiver utilizes the known data to improve the accuracy of the slicing errors, which enables fast adaptation of the ADEC, that improves the quality in the transceiver's operating point to a level that enables the transceiver to indicate the second transceiver to transmit data. wherein the quality degradation in the transceiver's operating point is quality degradation in the slicer input signal, which causes errors in slicing decisions above a predetermined threshold.

Referring to the embodiment above, optionally, the quality degradation in the transceiver's operating point is quality degradation in the slicing errors, which are indicative of the detection quality of the transceiver. Optionally, the quality degradation in the transceiver's operating point comprises identifying amount of CRC errors above a predetermined threshold. Optionally, within less than 100 microseconds from identifying the quality degradation, the transceiver utilizes the known data to improve quality in its operating point to a level that enables the transceiver indicate the second transceiver to transmit data. Optionally, the link maintains a fixed rate of data transmission, such that there is less than 2% difference between a first amount of unique data successfully transmitted over the link over a first 2-millisecond window that ends 100 microseconds before identifying the quality degradation and a second amount of unique data successfully transmitted over the link over a second 2-millisecond window adjacent to the first window. Optionally, the link maintains a fixed rate of data transmission, such that there is less than 1% difference between a first amount of unique data successfully transmitted over the link over a first 500 microseconds window that ends 50 microseconds before identifying the quality degradation and a second amount of unique data successfully transmitted over the link over a second 500 microseconds window adjacent to the first window. Optionally, the quality degradation would have caused a difference above 10% between the amounts of unique data successfully transmitted over the two adjacent 500 microseconds windows had the transceiver not been recovered from the quality degradation in its operating point. Optionally, the transceiver further utilizes retransmission to recover the packets that were lost from the time of the quality degradation in the operating point until the time of recovery. Optionally, using the known data enables the slicer to calculate the correct slicing errors based on the correct slicing decisions received from the PCS. Optionally, the transceiver utilizes the known data to improve quality in its operating point by utilizing the known data to improve the accuracies of the slicing decisions and the slicing errors, which are used to adapt the ADEC. Optionally, the ADEC comprises one or more equalizers selected from: Decision Feedback Equalizer (DFE) and Feed-Forward Equalizer (FFE), and one or more cancellers selected from: FEXT canceller, NEXT canceller, and DFE canceller. Optionally, the ADEC comprises an Adaptive Decision Feedback Equalizer (ADFE) with more than 50 taps, whereby the better the slicing decisions the lower the ADFE's error propagation. Optionally, the transceiver further utilizes a Physical Coding Sublayer (PCS) that extracts a bitstream from the slicing decisions, and feeds the bitstream to a link layer component that parses the bitstream into packets. Optionally, the link is a differential wired communication link. Optionally, the transceiver indicates the second transceiver to increase the rate according to the quality in transceiver's operating point. Optionally, the FA-MCC comprises an adaptive equalizer, and the more accurate the slicing errors the faster the convergence of the FA-MCC.

Embodiment #2

A method for recovering within less than 1 millisecond from quality degradation in a transceiver's operating point, comprising: receiving, by the transceiver, a signal of more than 500 Mbps from a second transceiver over a link; feeding the signal to an adaptive module comprising at least one of an adaptive digital equalizer and an adaptive digital canceller (ADEC), for generating a slicer input signal; utilizing the slicer input signal to generate slicing decisions and slicing errors; utilizing the slicing errors for adapting the ADEC; shortly after identifying quality degradation in the transceiver's operating point, indicating the second transceiver to transmitting known data; and within less than 1 millisecond from identifying the quality degradation, utilizing the known data to improve the accuracy of the slicing errors, which enables fast adaptation of the ADEC, that improves the quality in the transceiver's operating point to a level that enables the transceiver to indicate the second transceiver to transmit data.

Referring to the embodiment above, optionally, within less than 100 microseconds from identifying the quality degradation, further comprising utilizing the known data to improve the quality in the operating point to a level that enables the transceiver indicate the second transceiver to transmit data. Optionally, the link maintains a fixed rate of data transmission, such that there is less than 2% difference between a first amount of unique data successfully transmitted over the link over a first 2-millisecond window that ends 100 microseconds before identifying the quality degradation and a second amount of unique data successfully transmitted over the link over a second 2-millisecond window adjacent to the first window. Optionally, the link maintains a fixed rate of data transmission, such that there is less than 1% difference between a first amount of unique data successfully transmitted over the link over a first 500 microseconds window that ends 50 microseconds before identifying the quality degradation and a second amount of unique data successfully transmitted over the link over a second 500 microseconds window adjacent to the first window. Optionally, the method further utilizes retransmission to recover the packets that were lost from the time of the quality degradation in the operating point until the time of recovery.

Embodiment #3

A transceiver configured to recover within less than 1 millisecond from quality degradation in its operating point, comprising: a receiver analog front end (Rx AFE), an adaptive module comprising at least one of an adaptive digital equalizer and an adaptive digital canceller (ADEC), a common mode sensor AFE (CMS-AFE), a fast-adaptive mode-conversion canceller (FA-MCC), and a slicer; the Rx AFE receives a signal of more than 500 Mbps from a second transceiver over a differential wired communication link, and feeds the ADEC that generates an equalized signal; the CMS-AFE senses the common mode signal of the differential wired communication link and feeds the FA-MCC that generates a compensation signal; wherein the compensation signal is indicative of differential interference caused by mode-conversion of a common mode signal; the slicer utilizes the equalized signal and the compensation signal to generate slicing decisions and slicing errors; wherein the slicing errors are used to adapt the ADEC and the FA-MCC; shortly after identifying quality degradation in the transceiver's operating point, the transceiver indicates the second transceiver to reduce the rate of the transmitted data in order to improve detection rate at the transceiver; and within less than 1 millisecond from identifying the quality degradation, the transceiver utilizes the improved detection rate to improve the accuracy of the slicing errors, which enables fast adaptation of the ADEC, that improves the quality in the transceiver's operating point to a level that enables the transceiver to indicate the second transceiver to increase the rate.

Referring to the embodiment above, optionally, the identified quality degradation in the slicer input signal causes errors in slicing decisions above a predetermined threshold. Optionally, the FA-MCC is implemented as part of the ADEC. Optionally, the transceiver further utilizes the slicing decisions to adapt the ADEC and the FA-MCC. Optionally, the quality degradation in the transceiver's operating point is quality degradation in the slicer input signal, which causes errors in slicing decisions above a predetermined threshold. Optionally, the quality degradation in the transceiver's operating point is quality degradation in the slicing errors, which are indicative of the detection quality of the transceiver. Optionally, the quality degradation in the transceiver's operating point comprises identifying amount of CRC errors above a predetermined threshold. Optionally, within less than 100 microseconds from identifying the quality degradation, the transceiver utilizes the known data to improve quality in its operating point to a level that enables the transceiver indicate the second transceiver to transmit data. Optionally, the link maintains a fixed rate of data transmission, such that there is less than 2% difference between a first amount of unique data successfully transmitted over the link over a first 2-millisecond window that ends 100 microseconds before identifying the quality degradation and a second amount of unique data successfully transmitted over the link over a second 2-millisecond window adjacent to the first window. Optionally, the link maintains a fixed rate of data transmission, such that there is less than 1% difference between a first amount of unique data successfully transmitted over the link over a first 500 microseconds window that ends 50 microseconds before identifying the quality degradation and a second amount of unique data successfully transmitted over the link over a second 500 microseconds window adjacent to the first window. Optionally, the quality degradation would have caused a difference above 10% between the amounts of unique data successfully transmitted over the two adjacent 500 microseconds windows had the transceiver not been recovered from the quality degradation in its operating point. Optionally, the transceiver further utilizes retransmission to recover the packets that were lost from the time of the quality degradation in the operating point until the time of recovery. Optionally, using the known data enables the slicer to calculate the correct slicing errors based on the correct slicing decisions received from the PCS. Optionally, the transceiver utilizes the known data to improve quality in its operating point by utilizing the known data to improve the accuracies of the slicing decisions and the slicing errors, which are used to adapt the ADEC. Optionally, the ADEC comprises one or more equalizers selected from: Decision Feedback Equalizer (DFE) and Feed-Forward Equalizer (FFE), and one or more cancellers selected from: FEXT canceller, NEXT canceller, and DFE canceller. Optionally, the ADEC comprises an Adaptive Decision Feedback Equalizer (ADFE) with more than 50 taps, whereby the better the slicing decisions the lower the ADFE's error propagation. Optionally, the transceiver further utilizes a Physical Coding Sublayer (PCS) configured to extract a bitstream from the slicing decisions, and to feeds the bitstream to a link layer component that parses the bitstream into packets. Optionally, the link is a differential wired communication link. Optionally, the transceiver indicates the second transceiver to increase the rate according to the quality in transceiver's operating point. Optionally, the FA-MCC comprises an adaptive equalizer, and the more accurate the slicing errors the faster the convergence of the FA-MCC.

Embodiment #4

A method for recovering within less than 1 millisecond from quality degradation in a transceiver's operating point, comprising: a receiver analog front end (Rx AFE), an adaptive module comprising at least one of an adaptive digital equalizer and an adaptive digital canceller (ADEC), a common mode sensor AFE (CMS-AFE), a fast-adaptive mode-conversion canceller (FA-MCC), and a slicer; receiving, by the transceiver, a signal of more than 500 Mbps from a second transceiver over a differential wired communication link; feeding the signal to an adaptive module comprising at least one of an adaptive digital equalizer and an adaptive digital canceller (ADEC), for generating a slicer input signal; sensing the common mode signal of the differential wired communication link; feeding the sensed signal to a fast-adaptive mode-conversion canceller (FA-MCC) that generates a compensation signal; wherein the compensation signal is indicative of differential interference caused by mode-conversion of a common mode signal; utilizing the equalized signal and the compensation signal for generating slicing decisions and slicing errors; utilizing the slicing errors for adapting the ADEC and the FA-MCC; shortly after identifying quality degradation in the transceiver's operating point, indicating the second transceiver to reduce the rate of the transmitted data in order to improve detection rate at the transceiver; and within less than 1 millisecond from identifying the quality degradation, utilizing the improved detection rate to improve the accuracy of the slicing errors, which enables fast adaptation of the ADEC, that improves the quality in the transceiver's operating point to a level that enables the transceiver to indicate the second transceiver to increase the rate.

Referring to the embodiment above, optionally, within less than 100 microseconds from identifying the quality degradation, further comprising utilizing the known data to improve the quality in the operating point to a level that enables the transceiver indicate the second transceiver to transmit data. Optionally, the link maintains a fixed rate of data transmission, such that there is less than 2% difference between a first amount of unique data successfully transmitted over the link over a first 2-millisecond window that ends 100 microseconds before identifying the quality degradation and a second amount of unique data successfully transmitted over the link over a second 2-millisecond window adjacent to the first window. Optionally, the link maintains a fixed rate of data transmission, such that there is less than 1% difference between a first amount of unique data successfully transmitted over the link over a first 500 microseconds window that ends 50 microseconds before identifying the quality degradation and a second amount of unique data successfully transmitted over the link over a second 500 microseconds window adjacent to the first window. Optionally, the method further utilizes retransmission to recover the packets that were lost from the time of the quality degradation in the operating point until the time of recovery.

Certain elements of the following additional optional embodiments may be combined with the above described embodiments. The following embodiments are independent of the above described embodiments and are not intended to limit the above described embodiments in any way.

In one embodiment, a transceiver that recovers fast from a serious interference, includes: a first transceiver that communicates with a second transceiver over a link; the first transceiver comprises: a receiver analog front end (Rx AFE), an adaptive digital equalizer and canceller (ADEC), a slicer, a Physical Coding Sublayer (PCS), and link layer component; the Rx AFE receives a signal from the second transceiver and feeds the signal to the ADEC that feeds an equalized signal to the slicer that generates slicing decisions and slicing errors; the slicer decisions and the slicer errors are used to adapt the ADEC that generates the equalized signal; optionally, the ADEC comprises an Adaptive Decision Feedback Equalizer (ADFE) with more than 50 taps, the better the slicer decisions the lower the ADFE's error propagation, and the smaller the slicer errors the faster the ADFE's convergence; the PCS extracts a bitstream from the slicing decisions, and feeds the bitstream to the link layer component that parses the bitstream into packets; shortly after identifying a serious interference that causes an error above a predetermined threshold, the first transceiver indicates the second transceiver to transmit known data, the PCS utilizes the known data to provide correct decisions to the slicer, and the slicer calculates correct slicer errors based on the correct decisions and the equalized signal; and shortly after the ADFE eliminates the error propagation fast as a result of the correct decisions, and converges fast as a result of the correct slicer errors, the first transceiver indicates the second transceiver to transmit unknown data.

In one embodiment, a transceiver that recovers fast from a serious interference, includes: a first transceiver that communicates with a second transceiver over a differential wired communication channel; the first transceiver comprises: a receiver analog front end (Rx AFE), an adaptive digital equalizer and canceller (ADEC), a common mode sensor AFE (CMS-AFE), a fast-adaptive mode-conversion canceller (FA-MCC), a slicer, a Physical Coding Sublayer (PCS), and link layer component; the Rx AFE receives a signal from the second transceiver; the Rx AFE feeds the signal to the ADEC that generates an equalized signal; the CMS-AFE feeds an indication of the common mode to differential mode interference to the FA-MCC that generates a compensation signal to cancel a differential interference caused by mode-conversion of a common mode signal; the slicer generates slicing decisions and slicing errors based on the equalized signal and the compensation signal; the ADEC is adapted based on the slicer errors, and optionally also based on the slicer decisions; optionally, the ADEC comprises an Adaptive Decision Feedback Equalizer (ADFE) with more than 50 taps, the better the slicer decisions the lower the ADFE's error propagation, and the smaller the slicer errors the faster the ADFE's convergence; the FA-MCC is adapted based on the slicer errors, wherein the more accurate the slicer error is, the faster the FA-MCC converges; the PCS extracts a bitstream from the slicing decision, and feeds the bitstream to the link layer component that parses the bitstream into packets; shortly after identifying a serious interference that causes an error above a predetermined threshold, the first transceiver accelerates its adaptation to the serious interference by indicating the second transceiver to reduce the rate of the transmitted data; whereby the reduced rate improves the accuracies of both the slicer decisions and the slicer errors; and shortly after the ADFE reduces the error propagation fast as a result of the more accurate slicer decisions, and converges fast as a result of the better accuracy of the slicer errors, the first transceiver indicates the second transceiver to increase the rate of the transmitted data.

Referring to the embodiment above, optionally, the analyzing of the received signal comprises at least one of the following: extracting a packet from the received signal and identifying a CRC errors in the packet, identifying a slicing error above a predetermined threshold, identifying that the received signal is not an idle sequence on idle time, and receiving an indication of a serious interference from a common mode detector. In some example, detecting the serious interference based on the slicer error can lead to a very fast detection of the serious interference, even after just a few symbols, and especially when using a low modulation where the symbols are expected to be close to the decision levels of the slicer. Optionally, the detection module identifies the serious interference within less than 10 microseconds after the serious interference reaches a predetermined threshold. Optionally, the detection module identifies the serious interference within less than 1 microsecond after the serious interference reaches a predetermined threshold. Optionally, the transceiver receives the signal from a wired link, and it is assumed that the link parameters do not change during the time of the common mode interference.

In one embodiment, communication link comprising first and second transceivers that communicate time sensitive data over a link, includes: an Rx analog front end (AFE) and a common mode sensor AFE (CMS-AFE) coupled to a differential communication channel that is coupled to a second transceiver; the differential communication channel is not completely known, and the transceiver is expected to work at a first packet loss rate when there is no serious interference; from time to time the differential communication channel suffers from serious interference that increases the packet loss rate of the transceiver to a second packet loss rate that is at least ten times the first packet loss rate; the CMS-AFE extracts a digital representation of a common mode signal of the received differential signal, and forwards it to a fast-adaptive mode-conversion canceller (FA-MCC) that generates a compensation signal to cancel the differential interference caused by mode-conversion of the common mode signal; responsive to receiving an indication that the serious interference has occurred, the FA-MCC increases its adaptation step size (ASS) by at least 50% in order to cancel the effect of the serious interference fast; the Rx AFE extracts the received differential signal and feeds it to an adaptive digital equalizer and canceller (ADEC); the FA-MCC and the ADEC reconstruct a representation of the original transmitted signal, and feed the representation of the original transmitted signal to a slicer that feeds a Physical Coding Sublayer (PCS) with sliced symbols; the PCS extracts a bitstream from the sliced symbols, and feeds a link layer component that parses the sliced symbols into packets; the link layer component comprises a retransmission module that requests retransmission of packets with errors; wherein the FA-MCC converges at a short time such that the retransmissions caused by the serious interference still enables the transceiver to forward packets at the predetermined average rate and in the correct order after receiving the retransmitted packets; and the FA-MCC reduces its ASS after it cancels the effect of the serious interference.

Referring to the embodiment above, optionally, the FA-MCC converges at a short time such that the retransmissions caused by the serious interference still enables the transceiver to forward packets within a packet delay variation selected from the group of less than: 1 millisecond, 200 microseconds, and 50 microseconds.

In one embodiment, a transceiver that forwards time sensitive data at a predetermined average rate, comprises: a receiver analog front end (Rx AFE) and a common mode sensor AFE (CMS-AFE) coupled to a differential communication channel that is coupled to a second transceiver; the differential communication channel is not completely known, and the transceiver is expected to work at a first packet loss rate when there is no serious interference; from time to time the differential communication channel suffers from serious interference that increases the packet loss rate of the transceiver to a second packet loss rate that is at least ten times the first packet loss rate; the CMS-AFE extracts a digital representation of a common mode signal of the received differential signal, and forwards it to a fast-adaptive mode-conversion canceller (FA-MCC) that generates a compensation signal to cancel the differential interference caused by mode-conversion of the common mode signal; responsive to receiving an indication that the serious interference has occurred, the FA-MCC increases its adaptation step size (ASS) by at least 50% in order to cancel the effect of the serious interference fast; the Rx AFE extracts the received differential signal and feed it to an adaptive digital equalizer and canceller (ADEC); the FA-MCC and the ADEC reconstruct a representation of the original transmitted signal, and feed the representation of the original transmitted signal to a slicer that feeds a Physical Coding Sublayer (PCS) with sliced symbols; the PCS extracts a bitstream from the sliced symbols, and feeds a link layer component that parses the sliced symbols into packets; the link layer component comprises a retransmission module that requests retransmission of packets with errors; wherein the FA-MCC converges at a short time such that the retransmissions caused by the serious interference still enables the transceiver to forward packets at the predetermined average rate and in the correct order after receiving the retransmitted packets; and the FA-MCC reduces its ASS after it cancels the effect of the serious interference.

Referring to the embodiment above, in one example, the FA-MCC increases its ASS by at least 200% in order to cancel the effect of the serious interference fast. In another example, the FA-MCC increases its ASS by at least 1000% in order to cancel the effect of the serious interference fast. Optionally, the FA-MCC converges at a short time such that the retransmissions performed as a result of the serious interference still enable the transceiver to forward packets within a predetermined packet delay. Optionally, the predetermined packet delay variation is shorter than 100 microseconds. Optionally, the second packet loss rate, which is caused by the serious interference before it is cancelled by the mode conversion canceller, is at least 100, 1,000, 10,000, 100,000 times the first packet loss rate. Optionally, the predetermined average rate is calculated over a window shorter than 1 milli-second. Optionally, the retransmission module comprises a limited-size buffer having capacity sufficient to store all the packets that are transmitted when transmitting at the highest transmission rate for a period lasting no more than 40,000 symbols. Optionally, the retransmission module comprises a limited-size buffer having capacity sufficient to store all the packets that are transmitted when transmitting at the highest transmission rate for a period lasting no more than 5,000 symbols. Optionally, the transceiver and the second transceiver are implemented on integrated circuits having limited resources; and the second transceiver comprises a limited-size buffer having capacity sufficient to store all the packets that are transmitted when transmitting at the highest transmission rate for a period lasting no more than 40,000 symbols. Optionally, the FA-MCC is not configured to converge optimally, and does not reach an optimal solution even after 1 second. Optionally, the FA-MCC reduces its ASS, by at least 50%, within less than 50 microseconds after it cancels the effect of the serious interference. In one example, the FA-MCC reduces its ASS, by at least 200%, within less than 50 microseconds after it cancels the effect of the serious interference. Optionally, the FA-MCC reduces its ASS, by at least 50%, within less than 1 second after it cancels the effect of the serious interference. In one example, the FA-MCC reduces its ASS, by at least 400%, within less than 1 second after it cancels the effect of the serious interference. Optionally, the FA-MCC reduces its ASS, by at least 50%, within 1 second from the time the retransmission module finishes retransmitting the packets with errors that were lost during the time it took the FA-MCC to cancel the effect of the serious interference.

In one embodiment, a communication system, having a maximum throughput above 1.2 Gbit/s, implemented on an integrated circuit (IC) having limited resources, includes: a transceiver comprising a digital canceller coupled to an Rx analog front end (AFE) and a common mode sensor AFE (CMS-AFE) coupled to a differential communication channel that is coupled to a second transceiver; the differential communication channel is not completely known, and the transceiver is expected to work at packet loss below 1% when there is no serious interference; from time to time the differential communication channel suffers from serious interferences that increase the packet loss rate of the transceiver to above 5%; responsive to receiving an indication that the serious interference has occurred, a fast-adaptive mode-conversion canceller (FA-MCC) increases its adaptation step size (ASS) by at least 50% in order to cancel the effect of the serious interference within less than 100 microseconds; and a limited resources retransmission module (LRRM) stores and retransmit an amount of erred packets accumulated during less than 100 microseconds at the maximum throughput; wherein the FA-MCC reduces its ASS after it cancels the effect of the serious interference.

Referring to the embodiment above, optionally, the FA-MCC cancels the effect of the serious interference within less than 20 microseconds. Optionally, the LRRM stores and retransmit an amount of erred packets accumulated during less than 20 microseconds at the maximum throughput. Optionally, the digital canceller feeds a slicer that feeds a Physical Coding Sublayer (PCS) with quantization results; the PCS extracts packet data from the quantization results; and the retransmission module receives the packet data, and requests retransmission of packets with errors based on the packet data. Optionally, the retransmission module is implemented on the IC with limited resources that cannot support retransmission of more than 100% of the packets received during the time it takes the FA-MCC to cancel the effect of the serious interference. Optionally, the communication system achieves one or more of the following requirements: a maximum allowed jitter, a maximum amount of dropped packets, and requirements related to time sensitive data transmitted over the communication channel. Optionally, the retransmission module further comprises a buffer with a capacity that is sufficient to store the received packets until all packets are received successfully. Optionally, the capacity of the buffer is limited to store all the packets that are received during up to 20 microseconds while the packet loss rate is above 5%. Optionally, the FA-MCC is not configured to converge optimally, and does not reach an optimal solution even after 1 second. Optionally, the digital canceller comprises an equalizer and a Decision Based Filter (DBF). Optionally, the equalizer is a Feed Forward Equalizer (FFE). Optionally, the DBF is a filter fed by the slicer. Optionally, the FA-MCC reduces its adaptation step size by at least 50% within 1 second from the time the retransmission module finishes retransmitting packets with errors that were lost during the time it took the FA-MCC to cancel the effect of the serious interference. Optionally, the packet data comprises information related to a packet header, a packet payload, a packet tail, and an error detection code.

In one embodiment, a transceiver combining dynamic coding and fast recovery, includes: a digital canceller that is coupled to an Rx analog front end (AFE) and to a common mode sensor AFE (CMS-AFE) that are coupled to a differential communication channel that is coupled to a second transceiver; the differential communication channel is not completely known and the transceiver is expected to work at a first packet loss rate when there is no serious interference; from time to time the differential communication channel suffers from serious interferences that increase the packet loss rate of the transceiver to a second packet loss rate that is at least ten times the first packet loss rate; the digital canceller feeds a slicer that feeds a Physical Coding Sublayer (PCS) with quantization results; the PCS extracts the packets from the quantization results; responsive to receiving an indication that the serious interference has occurred, a rate controller indicates the second transceiver to reduce the code rate of the packets, transmitted over the differential communication channel, by at least 50%; the rate controller updates a fast-adaptive mode-conversion canceller (FA-MCC), the digital canceller and the slicer about the reduction in the code rate; concurrently, the FA-MCC increases its adaptation step size (ASS) by at least 50% in order to cancel, within less than 100 microseconds, the effect of the serious interference and to return the transceiver's packet loss rate to the first packet loss rate; and shortly after the FA-MCC cancels the effect of the serious interference, the rate controller indicates the second transceiver to increase the code rate, and updates the FA-MCC, the digital canceller and the slicer about the increment in the code rate; and the FA-MCC reduces its ASS after it cancels the effect of the serious interference.

Referring to the embodiment above, optionally, the rate controller indicates the second transceiver to reduce the code rate of the packets transmitted over the differential communication channel by 20% to 50%. Optionally, the rate controller indicates the second transceiver to reduce the code rate of the packets transmitted over the differential communication channel by 50% to 95%. Optionally, the FA-MCC utilizes large adaptation step size that enables it to cancel, within less than 20 microseconds, the effect of the serious interference and to return the transceiver's packet loss rate to the first packet loss rate. Optionally, the rate controller indicates the second transceiver to further increase the code rate until the second transceiver returns to the code rate used before the serious interference was detected. Optionally, the transceiver further comprises a retransmission module that requests retransmission of packets with errors, based on the packets extracted by the PCS. Optionally, the retransmission module is limited to support retransmission of up to 200% of the packets received during the time it takes the FA-MCC to cancel the effect of the serious interference. Optionally, the transceiver and the second transceiver utilize Dynamic Modulation Coding in order to reduce the code rate. Optionally, the packets are modulated using Pulse-Amplitude Modulation (PAM), and the rate controller commands the second transceiver to switch from using PAM16 to PAM4 until the FA-MCC cancels the effect of the serious interference. Optionally, the code rate is reduced by adding Error Correction Code to the packets. Optionally, the indication that the serious interference has occurred is based on one or more of the following values received from the PCS: a percent of lost packets, a rate of lost packets, a function of lost and successfully received packets, a score proportional to the detected interference, a score proportional to slicing error provided by the slicer, and a score proportional to number of errors detected by the PCS. Optionally, the update of the slicer by the rate controller comprises an indication to the slicer to change its slicer function to a slicing function suitable for the reduced code rate. Optionally, at least one of the packets that could not be sent due to insufficient bandwidth while the code rate was reduced, is discarded without attempting a delayed transmission or retransmission. Optionally, the packets carry video data, and the at least one discarded packet comprises video pixel data and does not include video controls. Optionally, at least some of the packets that could not be sent while the rate was reduced, are stored in a buffer at the second transceiver, and transmitted after the rate is restored to a level that permits transmission of the extra data. Optionally, the traffic transmitted over the differential communication channel comprises time sensitive data and time insensitive data, and while operating in the lower code rate, the second transceiver transmits the time sensitive data, and stores the time insensitive data in a buffer. Optionally, after cancelling the effect of the serious interference and restoring the code rate to a level having higher bandwidth, the second transceiver transmits the time sensitive data stored in the buffer. Optionally, the FA-MCC reduces the adaptation step size shortly after the increase in the code rate. Optionally, the FA-MCC reduces the adaptation step size, by at least 50%, within 1 second from the time of increasing the code rate.

In this description, references to "one embodiment" mean that the feature being referred to may be included in at least one embodiment of the invention. Moreover, separate references to "one embodiment" or "some embodiments" in this description do not necessarily refer to the same embodiment. Additionally, references to "one embodiment" and "another embodiment" may not necessarily refer to different embodiments, but may be terms used, at times, to illustrate different aspects of an embodiment.

The embodiments of the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and therefore may not necessarily correspond to discrete hardware elements.

While the methods disclosed herein have been described and shown with reference to particular steps performed in a particular order, it is understood that these steps may be combined, sub-divided, and/or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when a processor is disclosed in one embodiment, the scope of the embodiment is intended to also cover the use of multiple processors. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments. Accordingly, this disclosure is intended to embrace all such alternatives, modifications, and variations that fall within the spirit and scope of the appended claims and their equivalents.

What is claimed is:

1. A transceiver comprising:
a receiver analog front end (Rx AFE), an adaptive module comprising at least one of an adaptive digital equalizer and canceller (ADEC), a common mode sensor AFE (CMS-AFE), a fast-adaptive mode-conversion canceller (FA-MCC), and a slicer;

the Rx AFE receives a signal of more than 500 Mbps from a second transceiver over a differential wired communication link, and feeds the ADEC that generates an equalized signal;

the CMS-AFE senses a common mode signal of the differential wired communication link and feeds the FA-MCC that generates a compensation signal;

wherein the compensation signal is indicative of differential interference caused by mode-conversion; wherein mode-conversion refers to transferring energy from a common mode signal to a differential mode signal while using differential signaling; and the slicer utilizes the equalized signal and the compensation signal to generate slicing decisions and slicing errors; wherein the slicing errors are used to adapt the ADEC and the FA-MCC.

2. The transceiver of claim 1, wherein shortly after identifying quality degradation in the transceiver's operating point, the transceiver indicates the second transceiver to reduce the rate of the transmitted data in order to improve detection rate at the transceiver; and within less than 1 millisecond from identifying the quality degradation, the transceiver utilizes the improved detection rate to improve the accuracy of the slicing errors, which enables fast adaptation of the ADEC, that improves the quality in the transceiver's operating point to a level that enables the transceiver to indicate the second transceiver to increase the rate.

3. The transceiver of claim 2, further comprising utilizing the slicing decisions to adapt the ADEC and the FA-MCC.

4. The transceiver of claim 2, wherein the quality degradation in the transceiver's operating point is quality degradation in the slicer input signal, which causes errors in slicing decisions above a predetermined threshold.

5. The transceiver of claim 2, wherein the quality degradation in the transceiver's operating point is quality degradation in the slicing errors, which are indicative of the detection quality of the transceiver.

6. The transceiver of claim 2, wherein within less than 100 microseconds from identifying the quality degradation, the transceiver utilizes the reduced rate to improve quality in its operating point to a level that enables the transceiver to indicate the second transceiver to transmit data.

7. The transceiver of claim 2, wherein the link maintains a fixed rate of data transmission, such that there is less than 2% difference between a first amount of unique data successfully transmitted over the link over a first 2-millisecond window that ends 100 microseconds before identifying the quality degradation and a second amount of unique data successfully transmitted over the link over a second 2-millisecond window adjacent to the first window.

8. The transceiver of claim 2, further comprising utilizing retransmission to recover packets that were lost from time of the quality degradation in the operating point until the time of recovery.

9. The transceiver of claim 2, wherein the FA-MCC is implemented as part of the ADEC.

10. A method for recovering within less than 1 millisecond from quality degradation in a transceiver's operating point, comprising:

receiving, by the transceiver, a signal of more than 500 Mbps from a second transceiver over a differential wired communication link;

feeding the signal to an adaptive module comprising at least one of an adaptive digital equalizer and canceller (ADEC), for generating an equalized signal;

sensing a common mode signal of the differential wired communication link;

feeding the sensed signal to a fast-adaptive mode-conversion canceller (FA-MCC) that generates a compensation signal; wherein mode-conversion refers to transferring energy from a common mode signal to a differential mode signal while using differential signaling; and wherein the compensation signal is indicative of differential interference caused by mode-conversion of the common mode signal;

utilizing the equalized signal and the compensation signal for generating slicing decisions and slicing errors; and utilizing the slicing errors for adapting the ADEC and the FA-MCC.

11. The method of claim 10, further comprising shortly after identifying quality degradation in the transceiver's operating point, indicating the second transceiver to reduce the rate of the transmitted data in order to improve detection rate at the transceiver; and within less than 1 millisecond from identifying the quality degradation, utilizing the improved detection rate to improve the accuracy of the slicing errors, which enables fast adaptation of the ADEC, that improves the quality in the transceiver's operating point to a level that enables the transceiver to indicate the second transceiver to increase the rate.

12. The method of claim 11, wherein within less than 100 microseconds from identifying the quality degradation, further comprising utilizing the reduced rate to improve the quality in the operating point to a level that enables the transceiver to indicate the second transceiver to transmit data.

13. The method of claim 11, wherein the link maintains a fixed rate of data transmission, such that there is less than 2% difference between a first amount of unique data successfully transmitted over the link over a first 2-millisecond window that ends 100 microseconds before identifying the quality degradation and a second amount of unique data successfully transmitted over the link over a second 2-millisecond window adjacent to the first window.

14. The method of claim 11, wherein the link maintains a fixed rate of data transmission, such that there is less than 1% difference between a first amount of unique data successfully transmitted over the link over a first 500 microseconds window that ends 50 microseconds before identifying the quality degradation and a second amount of unique data successfully transmitted over the link over a second 500 microseconds window adjacent to the first window.

15. The method of claim 11, further comprising utilizing retransmission to recover packets that were lost from time of the quality degradation in the operating point until the time of recovery.

* * * * *